US012567323B2

(12) United States Patent
Uno

(10) Patent No.: US 12,567,323 B2
(45) Date of Patent: Mar. 3, 2026

(54) INFORMATION PROCESSING SYSTEM AND PROCESSING METHOD OF INFORMATION PROCESSING SYSTEM

(71) Applicant: TOYOTA JIDOSHA KABUSHIKI KAISHA, Toyota (JP)

(72) Inventor: Satoshi Uno, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 195 days.

(21) Appl. No.: 18/446,774

(22) Filed: Aug. 9, 2023

(65) Prior Publication Data

US 2024/0135804 A1 Apr. 25, 2024
US 2024/0233519 A9 Jul. 11, 2024

(30) Foreign Application Priority Data

Oct. 24, 2022 (JP) ................................ 2022-170078

(51) Int. Cl.
*G08G 1/01* (2006.01)

(52) U.S. Cl.
CPC .................................. *G08G 1/0112* (2013.01)

(58) Field of Classification Search
CPC ............................ G08G 1/0112; G08G 1/166
See application file for complete search history.

(56) References Cited

U.S. PATENT DOCUMENTS 8,718,910 B2 * 5/2014 Gueziec ............... G08G 1/0141
701/119
10,756,919 B1 * 8/2020 Kerzner ............... G05D 1/0282
2015/0019067 A1 * 1/2015 Chakravarty ......... B60W 40/09
701/31.5
2017/0341642 A1 * 11/2017 Suzuki ..................... G07C 5/00
2017/0372485 A1 * 12/2017 Tsunashima .............. G06T 7/20
2020/0098203 A1 3/2020 Uno
2022/0388542 A1 12/2022 Uno
2023/0410644 A1 12/2023 Hayashi et al.

FOREIGN PATENT DOCUMENTS

CN 106097724 A * 11/2016 .......... G06K 9/3241
JP 2020-052607 A 4/2020
JP 2022-186227 A 12/2022
WO 2022/107193 A1 5/2022

OTHER PUBLICATIONS

English translation of CN-106097724-A (Year: 2025).*

* cited by examiner

*Primary Examiner* — Hitesh Patel
*Assistant Examiner* — Shahira Baajour
(74) *Attorney, Agent, or Firm* — SoraIP, Inc.

(57) ABSTRACT

An information processing system for transmitting support information to a support target vehicle based on target vehicle data, the information processing system comprising: a moving body encounter situation estimating unit that estimates whether or not a situation of the area is a moving object encounter situation based on target vehicle data in a preset area; and a vehicle support unit that transmits support information to the support target vehicle when a situation of an area in which the support target vehicle is located is a moving object encounter situation, and does not transmit support information to the support target vehicle when a situation of an area in which the support target vehicle is located is not a moving object encounter situation.

5 Claims, 5 Drawing Sheets

INFORMATION PROCESSING SYSTEM AND PROCESSING METHOD OF INFORMATION PROCESSING SYSTEM

CROSS-REFERENCE TO RELATED APPLICATION

This application claims priority to Japanese Patent Application No. 2022-170078 filed on Oct. 24, 2022, incorporated herein by reference in its entirety.

BACKGROUND

1. Technical Field

The present disclosure relates to an information processing system and a processing method of the information processing system.

2. Description of Related Art

Conventionally, Japanese Unexamined Patent Application Publication No. 2020-052607 (JP 2020-052607 A) is known as a technical document related to an information processing system. The publication discloses an information processing system in which determination is made whether an unstable behavior is caused by a driver when a target vehicle of information collection has the unstable behavior.

SUMMARY

From the viewpoint of vehicle travel support, it has been considered to transmit support information on the collected unstable behavior or the like to a support target vehicle. However, transmitting all the information to the support target vehicle increases the communication load of a server or the vehicle. In addition, transmitting the support information is not always effective.

One aspect of the present disclosure is an information processing system that transmits support information to a support target vehicle based on target vehicle data including information on a position and travel of a plurality of target vehicles and object detection information on a surrounding object by the target vehicles. The information processing system includes: a moving body encounter situation estimating unit that estimates, based on the target vehicle data in an area set in advance, whether the area is in a moving body encounter situation; and a vehicle support unit that transmits the support information to the support target vehicle when the area that corresponds to the support target vehicle is in the moving body encounter situation, and that does not transmit the support information to the support target vehicle when the area that corresponds to the support target vehicle is not in the moving body encounter situation.

In the information processing system according to the one aspect of the present disclosure, the moving body encounter situation estimating unit may calculate a detected total number of moving bodies in the area based on the target vehicle data, and may determine that a situation of the area is not the moving body encounter situation when the detected total number is less than a total threshold value.

Another aspect of the present disclosure is a processing method of an information processing system that transmits support information to a support target vehicle based on target vehicle data including information on a position and travel of a plurality of target vehicles and object detection information on a surrounding object by the target vehicles.

The processing method includes performing the following processing: estimating, based on the target vehicle data in an area set in advance, whether the area is in a moving body encounter situation; and transmitting the support information to the support target vehicle when the area that corresponds to the support target vehicle is in the moving body encounter situation, and not transmitting the support information to the support target vehicle when the area that corresponds to the support target vehicle is not in the moving body encounter situation.

According to the one aspect and the other aspect of the present disclosure, it is possible to appropriately determine whether the transmission of the support information to the support target vehicle is needed in consideration of a communication load and a support effect.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings.

Figure 1:
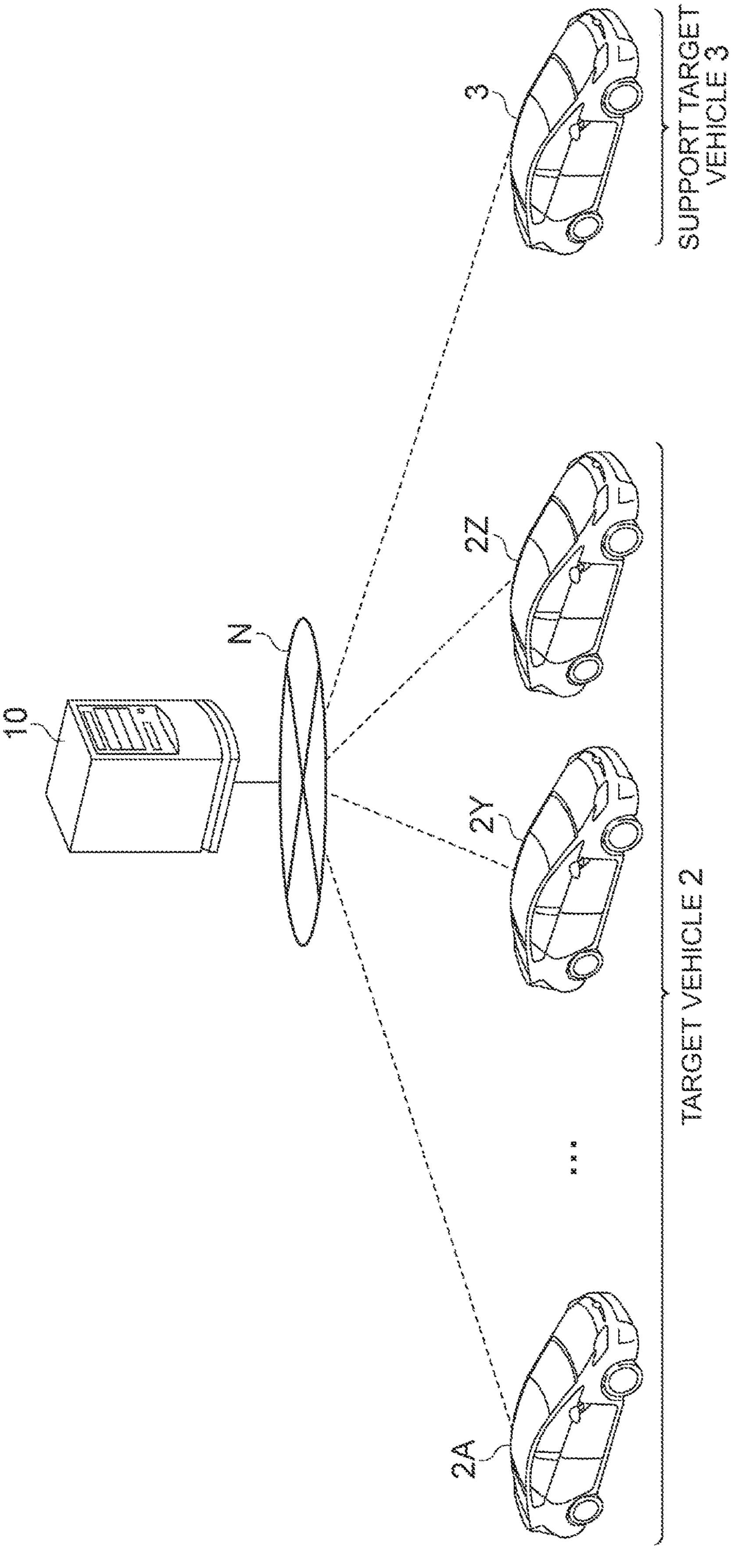
FIG. 1 is a diagram illustrating an information processing system according to an embodiment.

FIG. 1 is a diagram illustrating an information processing system 100 according to an embodiment. As illustrated in FIG. 1, in an information processing system 100, a target vehicle 2 (target vehicle 2A to 2Z) and a support target vehicle 3 are communicably connected to an information processing server 10 via a network N. The network N is a wireless communication network. As the network N, a well-known network can be adopted as long as it is wireless communication. The target vehicle 2 is an information collection target vehicle of the information processing system 100. The support target vehicle 3 is a vehicle to which support information is transmitted from the information processing server 10 as the travel support of the vehicle. The support target vehicle 3 may be a vehicle included in the target vehicle 2A to 2Z.

Figure 2:
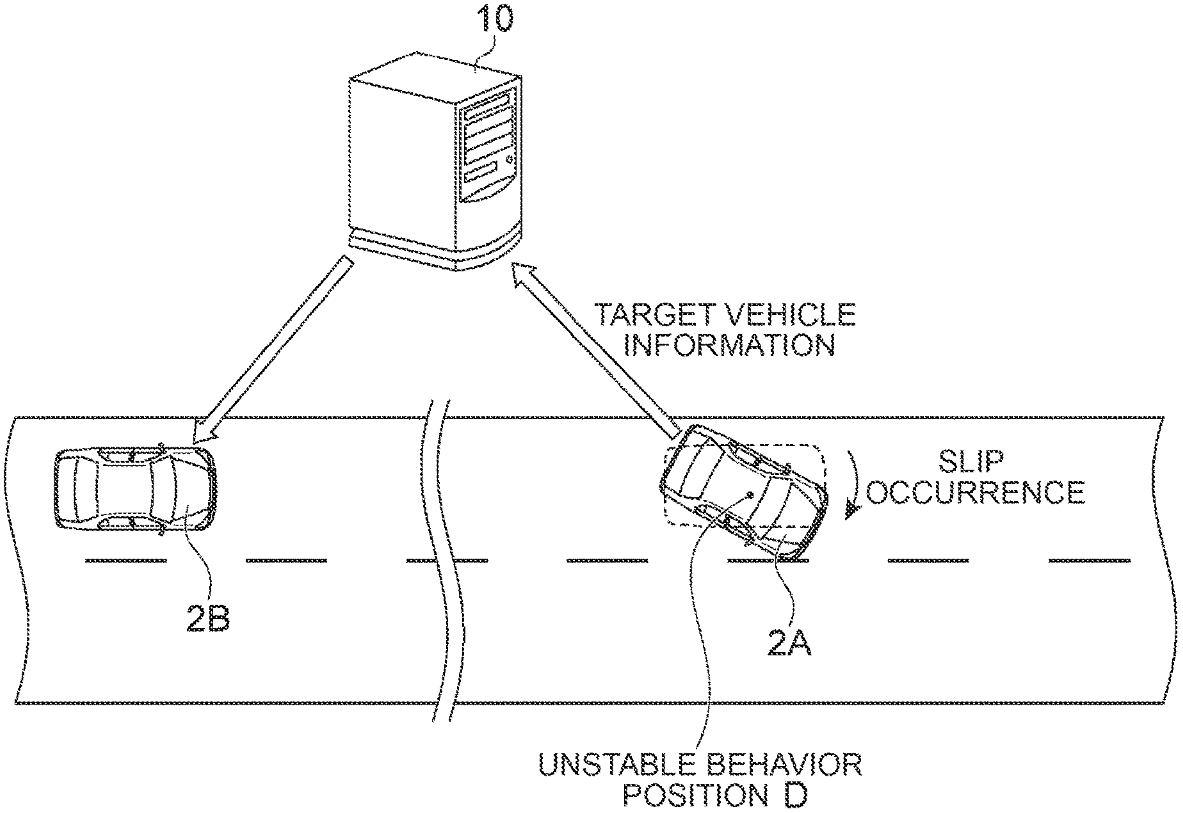
FIG. 2 is a diagram for explaining detection of an unstable behavior.

FIG. 2 is a diagram for explaining detection of an unstable behavior. As illustrated in FIG. 2, when a slip of the target vehicle 2A occurs due to road surface freezing or the like, the target vehicle 2A transmits target vehicle data including information on a position where the slip occurs (unstable behavior position D) to the information processing server 10. The information processing server 10 provides, for example, information on unstable behavior to the target vehicle 2B traveling behind the target vehicle 2A. Thus, in the target-vehicle 2B, slipping can be suppressed at the unstable behavior position D.

The target vehicle 2 is a vehicle that provides data to be processed by the information processing system 100. An identification (ID) for identifying the vehicle (vehicle identification number) is allocated to the target vehicle 2. The target vehicle may be one. The target vehicle 2 need not be a vehicle having the same configuration, and may be different in vehicle type or the like. The target vehicle may be an autonomous vehicle or a vehicle having no autonomous driving function.

The unstable behavior is a sudden behavior change that makes the traveling of the target vehicle 2 unstable. The unstable behavior includes slip. The unstable behavior may include a rapid deceleration or a rapid steering angle change. The unstable behavior may include a lane departure of the target vehicle 2, and may include an excessive approach to an object by the target vehicle 2 (such as a rear-end collision alarm). Objects may include structures such as utility poles, guardrails, road signs, walls, and the like, and may include moving objects such as other vehicles, pedestrians, bicycles, and the like.

The target vehicle data collected by the information processing system 100 includes position information of the target vehicle 2. The location information is generated in association with time. ID may be included in the target vehicle. The target vehicle data may include vehicle speed information of the target vehicle 2, acceleration information, and steering angle information and yaw rate information. The target vehicle data may include object detection information regarding an object around the target vehicle 2 detected by a sensor of the target vehicle 2, or may include information on a traveling position with respect to a lane. The target vehicle data may include driving operation information of the driver. The object detection information may include position information of an object viewed from the target vehicle 2 and type information of the object. The object type information includes information on types of stationary objects such as pedestrians, bicycles, two-wheeled vehicles, four-wheeled vehicles, and walls.

Further, the target vehicle data may include wiper operation information of the target vehicle 2. The target vehicle data may include road surface friction information calculated by an in-vehicle device of the target vehicle 2, or may include outside air temperature information detected by a temperature sensor of the target vehicle 2. The target vehicle data may include a captured image of an external camera of the target vehicle 2. The various types of information described above are associated with the position information and the time of the target vehicle 2.

Configuration of Information Processing System

Hereinafter, a configuration of the information processing system 100 according to the present embodiment will be described. The information processing system 100 illustrated in FIG. 1 includes an information processing server 10. The information processing system 100 may include at least a part of an on-vehicle arithmetic device of the target vehicle 2A to 2Z.

Figure 3:
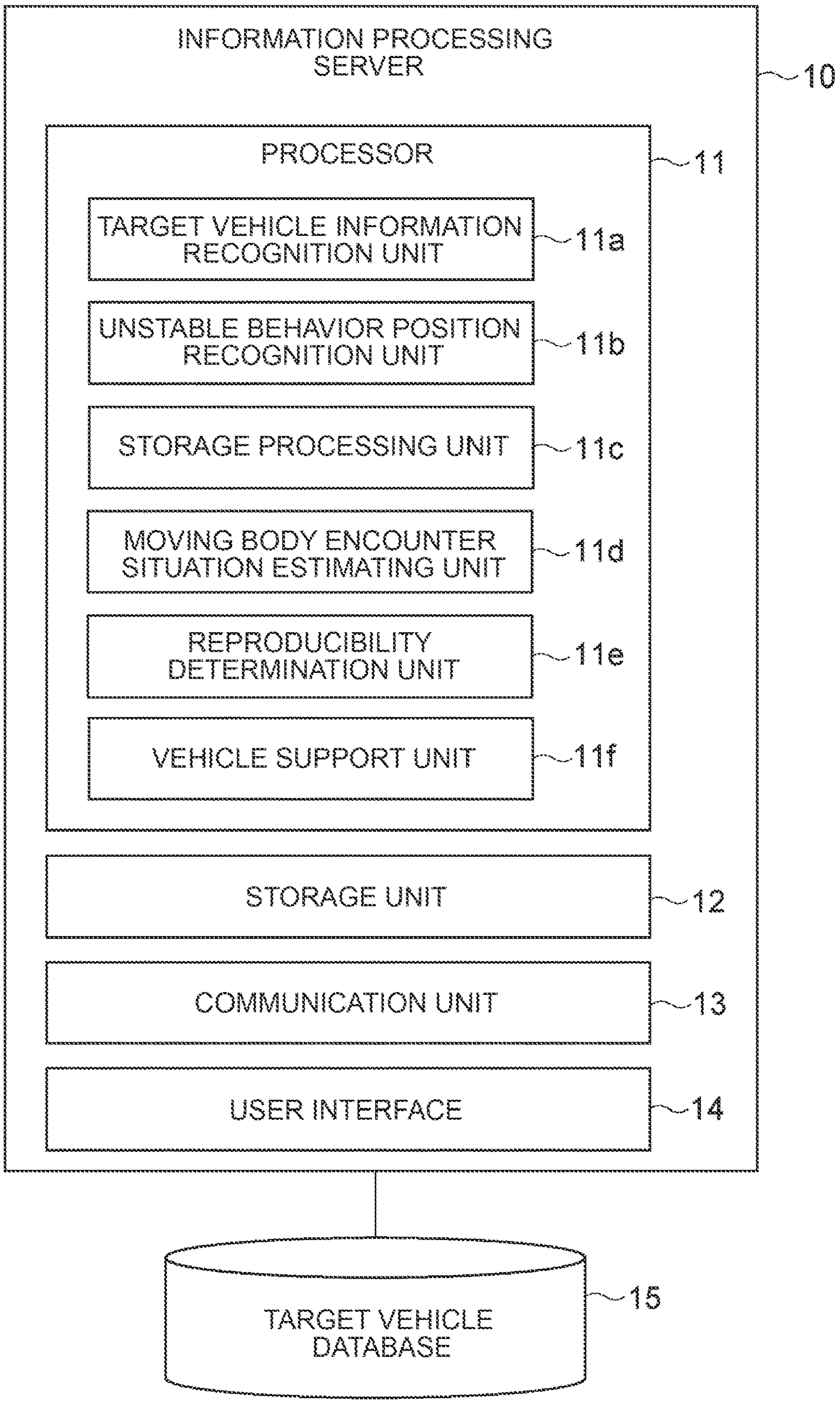
FIG. 3 is a block diagram illustrating an example of an information processing server.

The information processing server 10 is provided in a facility such as an information managing center, and is configured to be able to communicate with the target vehicle 2A to 2Z. FIG. 3 is a block diagram illustrating an example of a configuration of the information processing server 10. The information processing server 10 illustrated in FIG. 3 is configured as a general computer including a processor 11, a storage unit 12, a communication unit 13, and a user interface 14.

The processor 11 operates, for example, an operating system to control the information processing server 10. The processor 11 is an arithmetic unit such as a Central Processing Unit (CPU) including a control device, an arithmetic device, a register, and the like. The processor 11 manages the storage unit 12, the communication unit 13, and the user interface 14. The storage unit 12 includes at least one of a memory and a storage. The memories are recording media such as Read Only Memory (ROM), Random Access Memory (RAM). Storage is a recording medium such as Hard Disk Drive (HDD).

The communication unit 13 is a communication device for performing communication via the network N. Network devices, network controllers, network cards, etc. can be used for communication part 13. The user interface 14 is a device including a display, an output device such as a speaker, and an input device such as a touch panel. Note that the information processing server 10 is not necessarily provided in a facility, and may be mounted on a moving body such as a vehicle or a ship. The information processing server may include a plurality of servers.

The information processing server 10 is connected to a target vehicle database 15 that stores target vehicle data of the target vehicle 2 in the past. The target-vehicle database 15 has a storage device such as a HDD, and can have a configuration similar to that of a well-known database.

The target vehicle database 15 may store target vehicle data in association with a plurality of preset areas. The area is set by dividing the area by a predetermined range on a map, for example. The area may be set, for example, by a 10 km mesh (10 km square), by a 5 km mesh, or by a 3 km mesh. It may be set by a mesh of 10 km or more. The area does not need to have the same shape, and may be set as an area in which the environment is likely to be uniform depending on the terrain.

Figure 4:
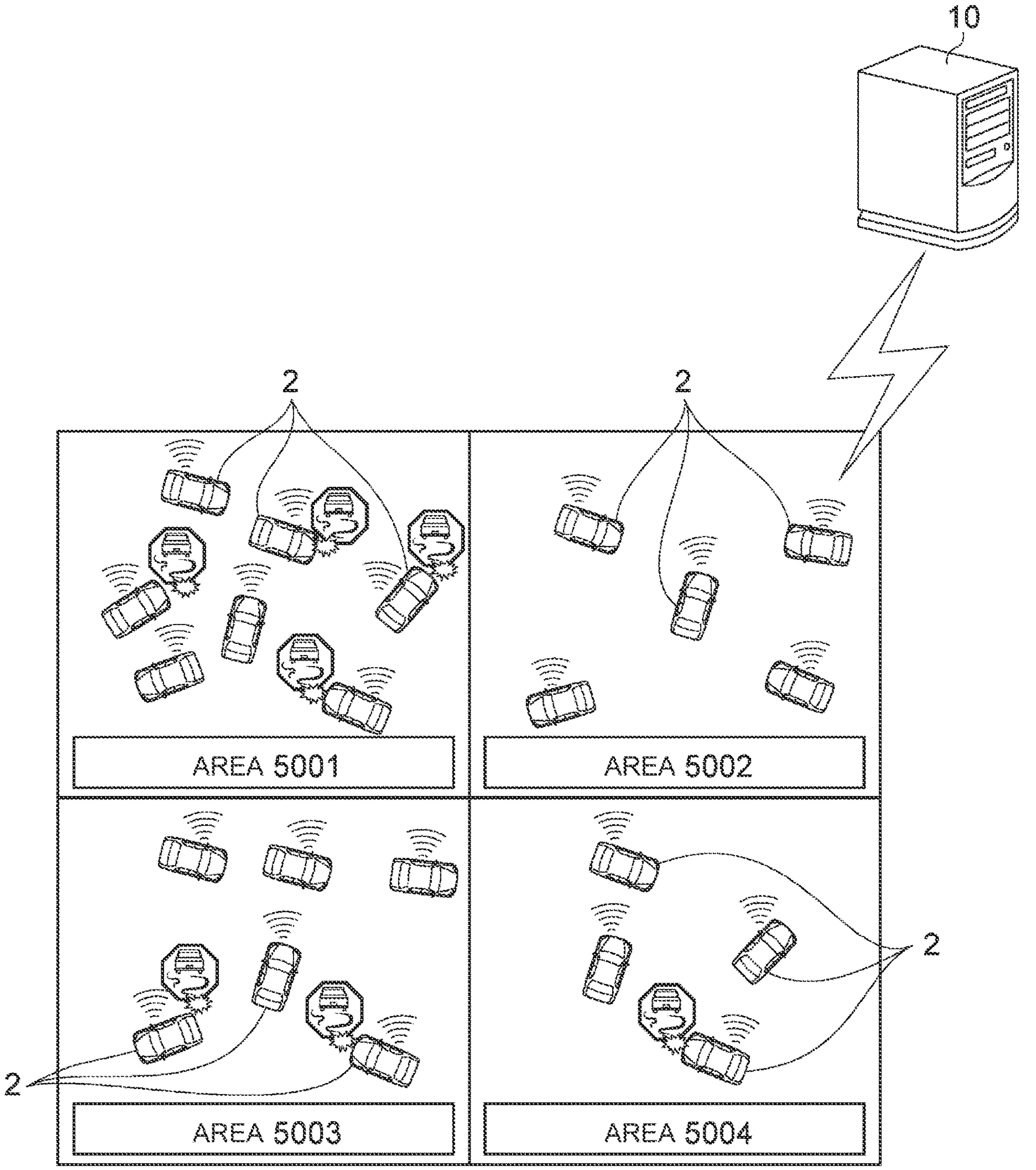
FIG. 4 is a diagram for explaining an example of an area.

The area may be set as a mesh code. The mesh code is defined from latitude and longitude information, and a unique code is assigned to each mesh. FIG. 4 is a diagram for explaining an example of an area. As shown in FIG. 4, mesh codes such as area 5001, area 5002, area 5003, and area 5004 can be given. When a mesh code is used for the area, the target vehicle 2 and the information processing server 10 do not need to have map information.

The position information of the target vehicle 2 can be acquired as latitude and longitude information from Global Positioning System (GPS) or Global Navigation Satellite System (GNSS) mounted on the target vehicle 2. It also contributes to cost reduction by using no map. The target vehicle database 15 may be integrated with the information processing server 10, or may be provided in a facility or the like remote from the information processing server 10.

Next, a functional configuration of the processor 11 will be described. As illustrated in FIG. 3, the processor 11 includes a target vehicle information recognition unit 11*a*, an unstable behavior position recognition unit 11*b*, a storage processing unit 11*c*, a moving body encounter situation estimating unit 11*d*, a reproducibility determination unit 11*e*, and a vehicle support unit 11*f*.

The target vehicle information recognition unit 11*a* recognizes the target vehicle data transmitted from the target vehicle 2. The target vehicle data is as described above. The target vehicle information recognition unit 11*a* acquires target vehicle data including position information and times through communication with the target vehicle 2.

The unstable behavior position recognition unit 11*b* detects the unstable behavior of the target vehicle 2 based on the target vehicle data acquired by the target vehicle information recognition unit 11*a*. Hereinafter, one vehicle whose unstable behavior is currently detected among the plurality of target vehicles 2 will be used as the target vehicle 2A.

The unstable behavior position recognition unit 11*b* may use a known Antilock Brake System (ABS) for detecting slippage. For example, in an anti-lock braking system, as an example, the wheel speed of each wheel is compared with the estimated vehicle body speed to operate when the wheels that are considered to be locked are identified. The estimated vehicle body speed may be obtained from the wheel speed of each wheel until slipping, or may be obtained from the change in acceleration until slipping.

In addition, the unstable behavior position recognition unit 11*b* may use an operation start condition of a known Vehicle Stability Control (VCS) for detecting slippage, or may use an operation start condition of a known Traction Control System (TRC). Traction control can also be activated by comparing the wheel speed of each wheel with the estimated vehicle body speed, if an idle wheel is identified. The unstable behavior position recognition unit 11*b* may detect slipping of the target vehicle 2 by another known method.

The unstable behavior position recognition unit 11*b* may detect the sudden deceleration as the unstable behavior based on the deceleration detected by the acceleration sensor. In this case, the unstable behavior position recognition unit 11*b* detects the rapid deceleration of the target vehicle 2 when, for example, the absolute value of the deceleration becomes equal to or greater than the rapid deceleration threshold. The rapid deceleration threshold is a threshold of a preset value. Hereinafter, the threshold used in the description means a threshold of a preset value.

The unstable behavior position recognition unit 11*b* may detect a steered angle change as an unstable behavior based on the yaw rate detected by the yaw rate sensor. The unstable behavior position recognition unit 11*b* detects the steered angle change of the target vehicle 2 when the yaw rate becomes equal to or higher than the steered angle change threshold, for example. Instead of the yaw rate, a tire turning angle or a steering angle may be used. The unstable behavior position recognition unit 11*b* may detect the unstable behavior by machine learning or deep learning.

When the unstable behavior of the target vehicle 2 is detected, the unstable behavior position recognition unit 11*b* recognizes the position of the target vehicle 2 when the unstable behavior occurs as the unstable behavior position. The unstable behavior position recognition unit 11*b* recognizes the unstable behavior position in association with the times.

The storage processing unit 11*c* stores the unstable behavior data including the unstable behavior position in the target vehicle database 15. The storage processing unit 11*c* stores the unstable behavior data as part of the target vehicular data. The storage processing unit 11*c* may store the unstable behavior data in association with an area set in advance in the target vehicle database 15.

The moving body encounter situation estimating unit 11*d* estimates whether or not the respective areas are moving object encounter situations based on target vehicle data in a plurality of areas. The moving object encounter situation is a situation in which it can be estimated that a probability that a support target vehicle traveling in the area encounters the moving object is sufficient. The moving object is a moving object such as a pedestrian, a bicycle, a two-wheeled vehicle, or a four-wheeled vehicle. Hereinafter, an area of an estimation target of a moving body encounter situation is referred to as a target area.

The moving body encounter situation estimating unit 11*d* calculates the target vehicle data for each predetermined determination time (estimated time). The determination time may be 5 minutes, 10 minutes, or 15 minutes. The determination time may be a time of 5 minutes or less, or may be a time of 15 minutes or more. The determination time is not particularly limited. The calculation is performed by acquiring the target vehicle data from the target vehicle database 15.

The moving body encounter situation estimating unit 11*d* calculates a characteristic amount from the aggregated target vehicle data. The moving body encounter situation estimating unit 11*d* may calculate the detected total number of moving objects in the target area as one of the characteristic quantities used for estimating the moving object encounter situation. The moving body encounter situation estimating unit 11*d* calculates the detected total number of moving objects in the target area based on the target vehicle data in the target area.

Specifically, the moving body encounter situation estimating unit 11*d* calculates the detected total number of moving objects in the target area by counting the number of moving objects detected by each of the plurality of target vehicles 2 in the target area from the object detection information included in the target vehicle data.

Note that stationary objects such as utility poles and walls are not moving objects and therefore are not counted. A stopped vehicle on the road may be counted as a moving object, and may not be counted as a moving object. The parked vehicle outside the road does not have to be counted as a moving object, and may be counted as a moving object. When the position of the moving object is outside the target area, the moving body encounter situation estimating unit 11*d* may not count the moving object.

The moving body encounter situation estimating unit 11*d* may exclude the moving object of the duplication detecting from counting. The moving body encounter situation estimating unit 11*d* determines whether the possibility of duplication detection is high or low for each moving object based on the position of the target vehicle 2 and the object detection information included in the target vehicle data. When the position of the moving object detected by a certain target vehicle 2A and the position of the moving object detected by the target vehicle 2B are within a certain distance within a certain time, the moving body encounter situation estimating unit 11*d* determines that the possibility of the duplication detection of the moving object is high. The period of time may be five minutes, three minutes, or one minute. The distance may be 1 m, 2 m, or 5 m. The fixed time and the fixed distance can be arbitrarily set.

The moving body encounter situation estimating unit 11*d* may determine the possibility of duplicate detection by considering the type information of the moving object. The moving body encounter situation estimating unit 11*d* may determine the possibility of duplicate detection by acquiring position information of a pedestrian, a bicycle user, and a mobile terminal of a driver of the vehicle.

The moving body encounter situation estimating unit 11*d* estimates that the target area is not a moving object encounter state when the detected total number of moving objects in the target area is less than the total number threshold. The total number threshold is a threshold value of a preset value. The total number threshold may be a fixed value, or may be a value set in accordance with the size of the area of the target area. The total number threshold may be set as a larger value as the area of the target area is larger.

The moving body encounter situation estimating unit 11*d* may calculate the number of moving objects staying in the target area at the present time as one of the characteristic quantities used for estimating the moving object encounter situation. The moving body encounter situation estimating unit 11*d* calculates the number of stays of the moving object in the target area at the present time on the basis of the stay time set in advance according to the type of the moving object, the elapsed time from the determination time, and the target vehicle data.

The residence time is set to be a shorter time in the order of the pedestrian, the bicycle, the motorcycle, and the four-wheeler. The residence time is set as, for example, 15 minutes for a pedestrian, sufficient for a bicycle, three minutes for a two-wheeled vehicle, and one minute for a four-wheeled vehicle. The residence time may be adjusted according to the size of the area of the target area. The larger the area of the target area, the longer the residence time may be.

The residence number is the number of mobile objects in which the residence time remains at the current time. When the number of pedestrians in which the residence time remains at the present time is four and the number of four-wheeled vehicles is 10, the residence number of the moving body encounter situation estimating unit 11*d* is 14.

For example, when one pedestrian, one bicycle, one two-wheeled vehicle, and one four-wheeled vehicle are detected at 15:00, the moving body encounter situation estimating unit 11*d* calculates the number of stays as four at 15:00. The moving body encounter situation estimating unit 11*d* calculates the number of stays as three because the remaining time of the stay time of the four-wheeled vehicle becomes zero at 15:01. At 15:03, the moving body encounter situation estimating unit 11*d* calculates the number of stays as two because the remaining time of the stay time of the two-wheeled vehicle is zero. The moving body encounter situation estimating unit 11*d* calculates the number of stays as one, because the remaining time of the dwell time of the bike becomes zero at 15:10

The moving body encounter situation estimating unit 11*d* determines that the state of the area is not a moving object encounter state when the staying number of the moving object in the target area at the present time is less than the staying number threshold. The staying number threshold value is a threshold value of a preset value. The residence number threshold may be a fixed value, or may be a value set in accordance with the size of the area of the target area. The staying number threshold value may be set as a value that is larger as the area of the area is larger.

The moving body encounter situation estimating unit 11*d* estimates that the target area is a moving object encounter situation candidate when, for example, the detected total number of moving objects in the target area is equal to or greater than the total number threshold value and the staying number of moving objects in the target area is equal to or greater than the staying number threshold value. The mobile body encounter situation candidate is a pre-stage in which the mobile body encounter situation is estimated.

The moving body encounter situation estimating unit 11*d* counts the duration after estimating that the target area is a moving object encounter situation candidate. When determining that the detected total number of the moving objects in the target area is less than the total number threshold value, or when determining that the staying number of the moving objects in the target area is less than the staying number threshold value, the moving body encounter situation estimating unit 11*d* sets the duration time to zero, assuming that the target area is not a moving object encounter state candidate.

The moving body encounter situation estimating unit 11*d* estimates that the target area is a moving object encounter situation when it is determined that the duration of the moving object encounter situation candidates is equal to or longer than a predetermined time. The fixed time is not particularly limited. The fixed time may be 30 minutes, 20 minutes, 45 minutes, or 1 hour or more. The moving body encounter situation estimating unit 11*d* performs the above-described estimation of the moving object encounter state for each target area.

The reproducibility determination unit 11*e* determines whether or not the unstable behavior of the target vehicle 2A is reproducible when the unstable behavior position recognition unit 11*b* detects the unstable behavior of the target vehicle 2A (one of the target vehicles 2).

The reproducibility determination unit 11*e* may determine the reproducibility based on a determination result of whether or not the state of the target area (the area in which the target vehicle 2A travels) at the time of detecting the unstable behavior is an environmental deterioration scene. The reproducibility determination unit 11*e* determines that the unstable behavior is reproducible, for example, when the state of the target area at the time of detecting the unstable behavior is an environment-deteriorating scene. A method for determining an environment deterioration scene is described in Japanese Patent Application No. 2022-127863.

The reproducibility determination unit 11*e* may determine the reproducibility based on the determination result of the continuously occurring state of the unstable behavior. The reproducibility determination unit 11*e* determines that the unstable behavior is reproducible, for example, when the unstable behavior is continuously generated. A method for determining a continuous occurrence state is described in Japanese Patent Application No. 2021-094347.

The reproducibility determination unit 11*e* may determine the reproducibility using the machine-learning model based on the target vehicle-data. The machine learning model is, for example, a neural network such as a convolutional neural network (CNN). The neural network may include multiple layers including multiple convolutional and pooling layers. As the neural network, a deep learning network by deep learning may be used.

The machine learning model determines the reproducibility by extracting the feature amount from the target vehicle data of the target vehicle 2 in which the unstable behavior is detected. As the feature amount, any parameter can be used from the vehicle speed, acceleration, tire pressure, weight, vehicle size (vehicle height, vehicle width), vehicle type, driver's driving tendency, and the like of the target vehicle 2. The driving tendency of the driver can be obtained from the past driving operation information of the driver. In the determination of the driving tendency of the driver, the age, the sex, and other information of the driving experience of the driver may be used.

As the additional feature amount, a time when an unstable behavior occurs in the target vehicle 2, an outside air temperature, a road condition, or the like may be used. The machine learning model may have a function of indicating a characteristic quantity influencing the reproducibility determination result by a process of Local Interpretable Model agnostic Explanations (LIME) or a process of Shapley Additive Explanations (SHAP).

The vehicle support unit 11*f* transmits support data as travel support to the support target vehicle 3. The support target vehicle 3 is, for example, a vehicle capable of receiving information from the information processing server 10 among the target vehicle 2 traveling in the target area or the vehicle traveling in the target area. The support target vehicle 3 may include a vehicle that enters the target area within a predetermined time. The support target vehicle 3 may not be a vehicle in the target area, but may be a vehicle traveling within a certain distance from the unstable behavior position, or may be a vehicle in which the target route includes the unstable behavior position. A method for specifying the support target vehicle 3 is not particularly limited.

The support information is information (content) related to an unstable behavior. The support information may include the unstable behavior position, the type of the unstable behavior, and the vehicle information of the target vehicle 2 in which the unstable behavior has occurred. The content is not particularly limited as long as it can support the travel of the support target vehicle 3. The vehicle support unit 11*f* transmits, as the assistance information, information on the unstable behavior determined to be reproducible by the reproducibility determination unit 11*e*.

When the situation of the area corresponding to the support target vehicle 3 is a moving object encounter situation, the vehicle support unit 11*f* transmits the support information to the support target vehicle. Hereinafter, an area corresponding to the support target vehicle 3 is referred to as a support target area.

The support target area includes an area in which the support target vehicle 3 is traveling. The support target area may include an area in which the support target vehicle 3 is scheduled to travel. The area in which the support target vehicle 3 is scheduled to travel may be an area in which the road on which the support target vehicle 3 is traveling enters, or may be an area in which the target route set by the navigation system or the automatic driving system of the support target vehicle 3 enters.

The vehicle support unit 11*f* transmits the support information to the support target vehicle 3 via the network N. The support effect by the transmission of the support information increases as the possibility that the support target vehicle is entangled with the moving body such as the pedestrian or the other vehicle increases. Therefore, the vehicle support unit 11*f* transmits the support information to the support target vehicle when the support target area is a moving object encounter state.

The support target vehicle 3 performs route change or travel control so as to avoid unstable behavior, for example, using support information. The support target vehicle 3 may notify the driver of the unstable behavior position by a meter Multi Information Display (MID) or a display of the navigation system. The support target vehicle 3 may accelerate the alarm timing related to the occurrence of the unstable behavior at the unstable behavior position, or may accelerate the control intervention such as the pre-crash safety system when the unstable behavior occurs. The unstable behavior in this case is not limited to slip, and may include an unstable behavior such as excessive approach to another vehicle.

On the other hand, when the situation of the area corresponding to the support target vehicle 3 is not the moving object encounter situation, the vehicle support unit 11*f* does not transmit the support information to the support target vehicle. As a result, the vehicle support unit 11*f* does not transmit support information when it is unlikely that the support target vehicle 3 will cause unstable behavior in the situation encountered with the mobile, so that the communication load of the information processing server 10 and the support target vehicle 3 can be suppressed when the support effect by the transmission of support information is not high.

The vehicle support unit 11*f* may determine whether or not to transmit the support information based on the determination result of the vehicle encounter status only when the communication load of the information processing server 10 or the support target vehicle 3 is equal to or greater than a predetermined value. The communication load may be obtained from the size of the communication data amount in a certain period of time, or may be obtained from CPU usage rate. In addition, the communication load may be determined from a well-known index related to the communication load.

Processing Method of Information Processing System

Next, a processing method of the information processing system 100 according to the present embodiment will be described with reference to the drawings. FIG. is a flowchart illustrating an example of support information transmission determination processing of the information processing system 100. The information processing system 100 performs support information transmission determination processing, for example, when it is necessary to determine whether or not to transmit support information to the support target vehicle 3.

Figure 5:
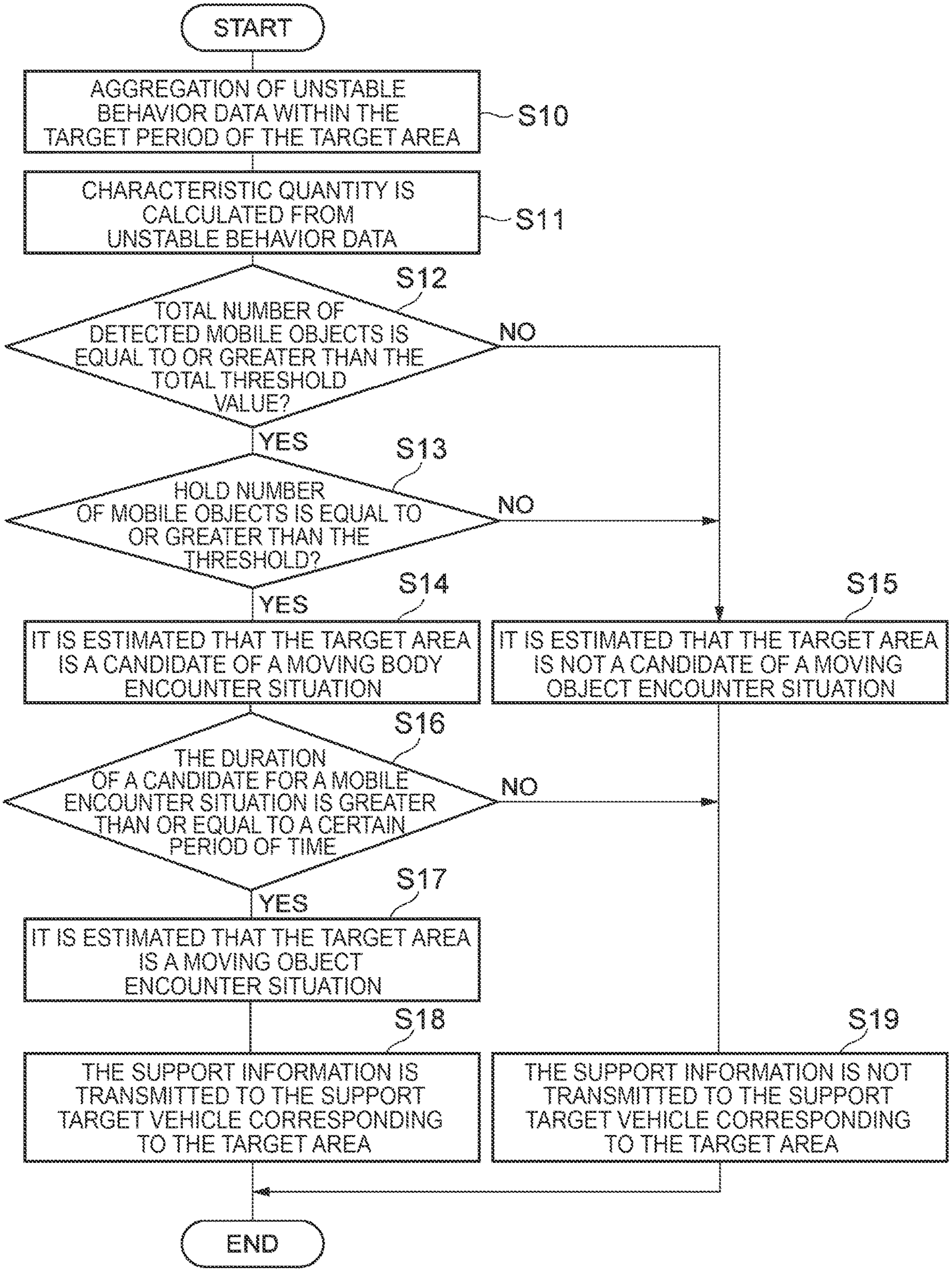
FIG. 5 is a flowchart illustrating an example of support-information-transmission determination process of the information processing system.

As illustrated in FIG. 5, as an S10, the information processing server 10 of the information processing system 100 aggregates the target vehicle data of the determination area at the determination time by the moving body encounter situation estimating unit 11*d*. The moving body encounter situation estimating unit 11*d* performs aggregation by acquiring target vehicle data from the target vehicle database 15. Thereafter, the information processing server 10 shifts to S11.

In S11, the information processing server 10 calculates the characteristic quantity from the target vehicle data by the moving body encounter situation estimating unit 11*d*. The moving body encounter situation estimating unit 11*d* calculates, for example, the detected total number of moving objects in the target area and the staying number of moving objects, as the characteristic quantity relating to the moving object encounter state.

In S12, the information processing server 10 determines whether the detected total number of the moving objects in the target area is equal to or larger than the total number threshold by the moving body encounter situation estimating unit 11*d*. When it is determined that the detected total number is equal to or larger than the total number threshold (S12: YES), the information processing server 10 shifts to S13. When it is not determined that the detected total number is equal to or larger than the total number threshold (S12: NO), the information processing server 10 shifts to S15.

In S13, the information processing server 10 determines whether or not the staying number of the moving object in the target area at the present time is equal to or larger than the staying number threshold by the moving body encounter situation estimating unit 11*d*. When it is determined that the staying number is equal to or larger than the staying number threshold (S13: YES), the information processing server 10 proceeds to S14. When it is not determined that the staying number is equal to or larger than the staying number threshold (S13: NO), the information processing server 10 proceeds to S15.

In S14, the information processing server 10 estimates that the target area is a moving object encounter situation candidate by the moving body encounter situation estimating unit 11*d*. Thereafter, the information processing server 10 shifts to S16. Note that the moving body encounter situation estimating unit 11*d* counts the duration while it is estimated as a moving object encounter situation candidate.

In S15, the information processing server 10 estimates that the target area is not a moving object encounter situation candidate by the moving body encounter situation estimating unit 11*d*. Thereafter, the information processing server 10 shifts to S19. Note that the moving body encounter situation estimating unit 11*d* cancels the count when it is estimated that the target area is not a moving object encounter situation candidate and the count of the duration while it is estimated that the target area is a moving object encounter situation candidate is being performed.

In S16, the information processing server 10 determines whether or not the duration of the moving object encounter situation candidates is equal to or longer than a predetermined time by the moving body encounter situation estimating unit 11*d*. When it is determined that the duration of the mobile encounter status candidates is equal to or longer than a predetermined time (S16: YES), the information processing server 10 shifts to S17. When it is determined that the duration of the mobile encounter status candidates is equal to or longer than a predetermined time (S16: NO), the information processing server 10 shifts to S19.

In S17, the information processing server 10 estimates that the target area is a moving object encounter state by the moving body encounter situation estimating unit 11*d*. Then, the process proceeds to S18. In S18, the information processing server 10 transmits support information for the support target vehicle 3 corresponding to the target area by the vehicle support unit 11*f*. Thereafter, the information processing server 10 ends the support information transmission determination process.

In S19, the information processing server 10 estimates that the target area is not the moving object encounter state by the moving body encounter situation estimating unit 11*d*, and does not transmit the support information for the support target vehicle 3 corresponding to the target area by the vehicle support unit 11*f*. Thereafter, the information processing server 10 ends the support information transmission determination process.

According to the information processing system 100 (and the processing method of the information processing system 100) according to the present embodiment described above, when the area is a moving object encounter situation, the support information is transmitted to the support target vehicle corresponding to the area, and when the area is not a moving object encounter situation, the support information is not transmitted to the support target vehicle. The support effect by the transmission of the support information increases as the possibility that the support target vehicle is entangled with the moving body such as the pedestrian or the other vehicle increases. Therefore, according to the information processing system 100, it is possible to appropriately determine whether or not to transmit the support information to the support target vehicle in consideration of the communication load and the support effect.

Further, according to the information processing system 100, it is possible to appropriately determine whether or not the target area is a moving object encounter situation by paying attention to the total number of detected moving objects in the target area. Similarly, according to the information processing system 100, it is possible to appropriately determine whether or not the target area is a moving object encounter situation as compared with a case where no attention is paid to the staying number by paying attention to the staying number of the moving object in the target area.

Although the embodiments of the present disclosure have been described above, the present disclosure is not limited to the above-described embodiments. The present disclosure may be embodied in various forms with various changes and modifications, including the above-described embodiments, based on the knowledge of those skilled in the art.

The information processing system 100 does not necessarily need to estimate a candidate of a moving object encounter situation. The moving body encounter situation estimating unit 11*d* may determine YES when, in S16, the duration of a state in which the detected total number is equal to or greater than the total number threshold and the staying number is equal to or greater than the staying number threshold is equal to or greater than a certain time.

The information processing system 100 does not necessarily need to determine the duration. The information processing system 100 may determine that the target area is a moving object encounter situation when the total number of detections is equal to or greater than the total number threshold and the staying number is equal to or greater than the staying number threshold.

The information processing server 10 does not necessarily have to have the reproducibility determination unit 11*e*. The vehicle support unit 11*f* may include information on the unstable behavior in the assistance information regardless of whether or not reproducibility is present.

The moving body encounter situation estimating unit 11*d* does not necessarily need to calculate both the detected total number and the residence number of the moving object. The moving body encounter situation estimating unit 11*d* may determine the moving object encounter state based on the determination result of one of the detected total number and the staying number of the moving object.

What is claimed is:

1. An information processing system comprising:
- a plurality of target vehicles,
- a processor, and
- a memory that is communicatively coupled to the processor, wherein
- the processor is configured to:
  - acquire target vehicle data from the plurality of target vehicles via a wireless network, the target vehicle data including position information, travel information, and information on surrounding objects detected by the plurality of target vehicles;
  - acquire unstable behavior data from the plurality of target vehicles in a case where an unstable behavior of the plurality of target vehicles occurs, the unstable behavior data including an unstable behavior position where the unstable behavior occurs and a type of the unstable behavior;
  - store, in the memory, the acquired unstable behavior data in association with a predetermined area including the unstable behavior position;
  - calculate, based on the acquired target vehicle data and an elapsed time from acquiring the target vehicle data, a total number of moving objects that have been present in the predetermined area for a corresponding time period, the corresponding time period for each moving object of the moving objects being predetermined in accordance with a classification of the moving object; the moving objects including the plurality of target vehicles and the surrounding objects;
  - determine whether the calculated total number is equal to or greater than a threshold value;
  - identify the predetermined area in a case where the calculated total number is equal to or greater than the threshold value;
  - determine whether a first target vehicle of the plurality of target vehicles is traveling or is scheduled to travel in the identified predetermined area based on the acquired target vehicle data; and
  - transmit support information to the first target vehicle in a case where the processor determines that the first target vehicle is traveling or is scheduled to travel in the identified predetermined area, the support information including the unstable behavior position and the type of the unstable behavior, and the first target vehicle is configured to notify the unstable behavior position and the type of the unstable behavior to a driver of the first target vehicle via a display of the first target vehicle to avoid the unstable behavior.

2. The information processing system according to claim 1, wherein the moving objects include pedestrians, bicycles, motorcycles, and four-wheeled vehicles, the corresponding time period for the pedestrians is set as 15 minutes, the corresponding time period for the bicycles is set as 15 minutes, the corresponding time period for the motorcycles is set as 3 minutes, and the corresponding time period for the four-wheeled vehicles is set as 1 minute.

3. The information processing system according to claim 1, wherein the corresponding time period is adjusted based on a size of the predetermined area.

4. The information processing system according to claim 1, wherein the processor is further configured to:

determine whether a communication load of the processor is equal to or greater than a predetermined value, and transmit the support information to the first target vehicle in a case where the processor determines that the communication load of the processor is equal to or greater than the predetermined value.

5. A processing method of an information processing system, the processing method comprising performing the following processing:

acquiring target vehicle data from a plurality of target vehicles via a wireless network, the target vehicle data including position information, travel information, and information on surrounding objects detected by the plurality of target vehicles;

acquiring unstable behavior data from the plurality of target vehicles in a case where an unstable behavior of the plurality of target vehicles occurs, the unstable behavior data including an unstable behavior position where the unstable behavior occurs and a type of the unstable behavior;

storing, in a memory, the acquired unstable behavior data in association with a predetermined area including the unstable behavior position;

calculating, based on the acquired target vehicle data and an elapsed time from acquiring the target vehicle data, a total number of moving objects that have been present in the predetermined area for a corresponding time period, the corresponding time period for each moving object of the moving objects being predetermined in accordance with a classification of the moving object, the moving objects including the plurality of target vehicles and the surrounding objects;

determining whether the calculated total number is equal to or greater than a threshold value;

identifying the predetermined area in a case where the calculated total number is equal to or greater than the threshold value;

determining whether a first target vehicle of the plurality of target vehicles is traveling or is scheduled to travel in the identified predetermined area based on the acquired target vehicle data;

transmitting support information to the first target vehicle in a case where determination is made that the first target vehicle is traveling or is scheduled to travel in the identified predetermined area, the support information including the unstable behavior position and the type of the unstable behavior; and notifying the unstable behavior position and the type of the unstable behavior to a driver of the first target vehicle via a display of the first target vehicle to avoid the unstable behavior.

* * * * *